United States Patent
Shah et al.

(10) Patent No.: US 10,789,108 B2
(45) Date of Patent: Sep. 29, 2020

(54) CROSS-PLATFORM REMOTE USER EXPERIENCE ACCESSIBILITY

(71) Applicant: Microsoft Technology Licensing, LLC, Redmond, WA (US)

(72) Inventors: Shrey Nitin Shah, Redmond, WA (US); Philippe Blais, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/260,529

(22) Filed: Jan. 29, 2019

(65) Prior Publication Data

US 2020/0241934 A1 Jul. 30, 2020

(51) Int. Cl.
*G06F 3/00* (2006.01)
*G06F 9/54* (2006.01)
*G06F 16/383* (2019.01)
*G06F 3/16* (2006.01)

(52) U.S. Cl.
CPC .............. *G06F 9/541* (2013.01); *G06F 3/167* (2013.01); *G06F 9/542* (2013.01); *G06F 9/547* (2013.01); *G06F 16/383* (2019.01)

(58) Field of Classification Search
CPC ....................................................... G06F 9/542
USPC ......................................................... 719/318
See application file for complete search history.

(56) References Cited

U.S. PATENT DOCUMENTS

| 9,218,500 B2* | 12/2015 | Eldar | G06F 21/6218 |
| 2010/0138370 A1* | 6/2010 | Wu | G06Q 30/02 706/12 |
| 2014/0013234 A1 | 1/2014 | Beveridge et al. | |
| 2016/0306502 A1* | 10/2016 | Ramadge | G06F 3/04847 |
| 2016/0320935 A1 | 11/2016 | Shin et al. | |
| 2016/0321218 A1* | 11/2016 | Farncombe | G06F 17/227 |
| 2017/0201639 A1* | 7/2017 | Saka | H04N 1/00514 |

OTHER PUBLICATIONS

Eugene Wu, High-Performance Complex Event Processing over Streams. (Year: 2006).*
"International Search Report and Written Opinion Issued in PCT Application No. PCT/US2020/014673", dated May 12, 2020, 12 Pages.

* cited by examiner

*Primary Examiner* — Lechi Truong (57) ABSTRACT

In non-limiting examples of the present disclosure, systems, methods and devices for assisting with cross-platform user experience accessibility are provided. A real-time connection between a remote device and a host device may be established. The remote device may apply a plurality of rules to event metadata that it generates. The filtered event metadata corresponding to a plurality of user experience events occurring on the remote device may be received by the host device. One or more transforms may be applied to the filtered event metadata on the host device. A native accessibility experience corresponding to each of the plurality of user experience events may be provided by the host device based on the transformed event metadata.

4 Claims, 9 Drawing Sheets

CROSS-PLATFORM REMOTE USER EXPERIENCE ACCESSIBILITY

BACKGROUND

Computing devices have become ubiquitous in most aspects of life. It is now common for users to be connected to at least one device at any given time, and sometimes even two or three devices at once. One of the reasons that computing devices have become so ubiquitous to everyday users is due to the number of options available to those users. For any given device type (e.g., phone, tablet, laptop, desktop) there are multiple device manufacturers with their own set of hardware configurations, in addition to unique operating system types and application suites that may be run on those devices. Thus, it is not uncommon for a user to have, and frequently use, a smart phone that operates on a first platform, a tablet that operates on a second platform, and one or more desktop and/or laptop computing devices that operate on one or more additional platforms.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with cross-platform user experience accessibility. A common scenario related to multi-device use cases is the ability to "remote access" one device from another and interact with the native experience (e.g., remote desktop or visual network computing). While the focus of these scenarios is to allow the user of one device form factor to leverage the experience/resources of another, one of the key gaps is an "accessibility" model that allows a user to leverage platform-native accessibility tools.

Aspects of the current disclosure provide mechanisms for allowing cross-platform and cross-device access to native accessibility experiences by leveraging an event metadata monitoring engine and an event metadata filtering engine on the remote device side, while leveraging a translation engine for injecting augmented and/or transformed metadata into a host device's native accessibility engine. In examples, a user may link a host device with a remote device via a device mirroring application and a network (e.g., Bluetooth network, local area network, WiFi network, etc.). The remote device user interface may thus be mirrored on the host device, while allowing the user to interact with the remote device via the host device's native controls. The metadata monitoring engine on the remote device monitors all or a specified set of event metadata generated by the remote device, and the metadata filtering engine applies a set of rules to identify accessibility-relevant metadata (e.g., contextual metadata). In examples, the metadata filtering engine may tag the relevant metadata and the remote device may then send that tagged metadata to the host device for processing by the translation engine. The translation engine may augment and/or transform the metadata to a form that is readable and insertable for execution by the native accessibility engine of the host device. The native accessibility engine may execute one or more accessibility operations on that augmented and/or transformed metadata and produce a native accessibility experience for the remote device within the host device's device mirroring application.

BRIEF DESCRIPTION OF THE DRAWINGS

Non-limiting and non-exhaustive examples are described with reference to the following figures.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for assisting with cross-platform user experience accessibility. As used herein, "platform" describes a specific environment comprised of a set of computer hardware and an operating system on which software is executed. For example, a first computing device may be said to run on a first platform that is different than a second platform if it has a unique set of one or both of: hardware components and/or an operating system (including an operating system version), and a second computing device may be said to run on a second platform that is different from the first platform if it has a set of one or both of: hardware components and/or an operating system (including an operating system version), that is different than the first computing device.

A "host device" as described herein is a device that a user may control and/or view a copy, in real or near real-time, of a user interface of a "remote device". A "remote device" as described herein is a device that may have its user interface copied, in real or near real-time, on a device mirroring application of a host device. The remote device may be controlled via the native controls of the host device via the device mirroring application.

Aspects described herein utilize a monitoring engine on a remote device to monitor metadata generated by the remote device. The monitoring component may subscribe and/or be granted access to all or a subset of metadata generated by the remote device. A filtering element may apply a set of rules geared toward identifying accessibility-relevant metadata from the monitored set of metadata. The monitoring engine and the filtering engine may be encompassed as part of a device mirroring application executed on the remote device and/or they many be encompassed by the operating system of the remote device. In some examples, the filtering engine may tag metadata that it has identified as potentially being accessibility-relevant and the host device may send that information to a host device that it is connected/linked to. A translation engine on the host device may augment and/or transform the received metadata from its raw form into a form that is readable and executable by a native accessibility engine operating on the host device. The translation engine may be encompassed in the device mirroring application of the host device and/or within the operating system of the host device. The accessibility engine may be an engine that is applied not only to remote device metadata that has been augmented and/or transformed, but also to metadata that has been generated by the host device itself. By utilizing the same accessibility engine for self-generated and remote-generated metadata, the host device can provide a native accessibility experience regardless of the device that is being interacted with via the host device. The accessibility experience for the remote device may be produced by the accessibility engine in the device mirroring application.

The systems, methods, and devices described herein provide technical advantages for providing access to accessibility experiences on multiple devices. By allowing users to leverage a native accessibility engine for producing a native accessibility experience on a host device for a remote device, users with visual, hearing, and reading impairments can take advantage of processing and memory savings associated with multi-device and multi-platform experiences. Processing costs are reduced by allowing a user to access data and/or perform operations on a linked device (e.g., either the host device or the remote device) based on which of those devices has the best resources available to it for performing those actions. For example, an application may be available on the host device platform and the remote device platform, but the application may have less problems being executed on one of those platforms over the other and/or the application may have more features available to it on one platform or the other. A user with visual, hearing and/or reading impairments, utilizing the native accessibility experiences of a host device as described herein, is thus able to access the application via a single display (i.e., the host display) regardless of whether the application is actually being executed on the remote device. Memory costs are also improved by allowing a user to spread the storage requirements associated with executing multiple applications (i.e., applications on a host device and applications on a remote device) across multiple devices and platforms while providing an enhanced user experience by allowing the user to access all of the applications from a single integrated display on the host device.

Providing a normalized accessibility experience also provides an enhanced user experience. For example, users with visual impairments may typically use a narration accessibility tool to navigate a user interface, including user interface elements and text elements. These users also typically use headphones for listening to that narration tool but wired headphones can generally only be utilized to listen to a single device output. By providing a native accessibility narration experience for a remotely accessed device on the host device, a user can thus be provided with a narration output from both devices in a single format and connection. Additionally, the user experience is enhanced via utilizing the native accessibility experience of the host device by providing a single accessibility toolset to users regardless of the remote platform being accessed. Thus, a user does not have to understand multiple renderings and mechanisms for producing visual accessibility tools for multiple platforms even in the instance that the remote device and the host device have their own accessibility tools for a particular type of element.

Figure 1:
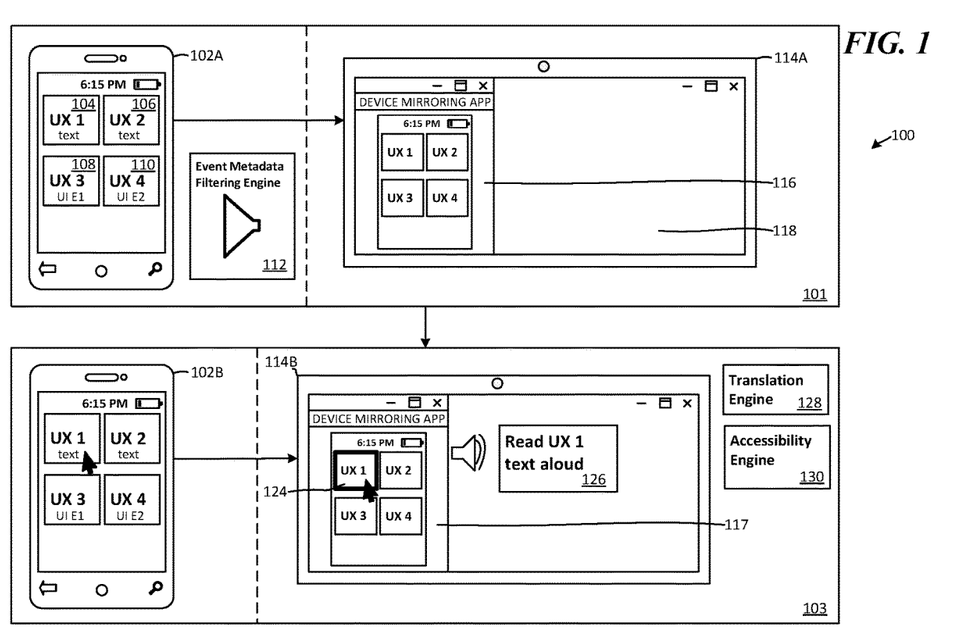
FIG. 1 is a schematic diagram illustrating an example distributed computing environment for enabling cross-platform remote accessibility experiences.

FIG. 1 is a schematic diagram illustrating an example distributed computing environment 100 for enabling cross-platform remote accessibility experiences. Computing environment 100 includes event metadata filtering sub-environment 101, and event metadata translation and native accessibility experience sub-environment 103. Both of event metadata filtering sub-environment 101 and event metadata translation and native accessibility experience sub-environment 103 include the same two computing devices. That is, metadata filtering sub-environment 101 includes remote computing device 102A and host computing device 114A, which are the same computing devices as remote computing device 102B and host computing device 114B in event metadata translation and native accessibility experience sub-environment 103. The computing devices in event metadata filtering sub-environment 101 illustrate the filtering of event metadata from remote computing device 102A. Alternatively, the devices in event metadata translation and native accessibility experience sub-environment 103 illustrate the translation of the filtered event metadata by host computing device 114B and providing of a native accessibility experience via a device mirroring application executed on host computing device 114B based on the translation of the filtered event metadata.

Remote computing device 102A displays four exemplary user experience elements, which for illustrative purposes are labeled as: UX1 104, UX2 106, UX3 108 and UX4 110. UX1 104 and UX2 106 may comprise some portion of text, while UX3 108 and UX4 110 may comprise some other type or types of user experience elements (e.g., display windows, search bars, navigation tabs, navigation tools, loading icons, etc.). Event metadata filtering engine 112 is shown next to remote computing device 102A for illustrative purposes, but it should be understood that metadata filtering engine 112 is executed on and by remote computing device 102A. In some examples, event metadata filtering engine 112 may be executed as part of a local device mirroring application installed and/or accessed by remote computing device 102A.

Host computing device 114A is running device mirroring application 116. Device mirroring application 116 may be utilized to connect with one or more other computing devices (e.g., remote computing device 102A) that operate on a same or different platform as host computing device 114A, and mirror one or more of the features being executed and/or displayed by the connected computing devices. In some examples, device mirroring application 116 may be launched and/or connected to another computing device that it has been granted access to when a user specifically opens/starts device mirroring application 116 from host computing device 114A. In other examples, device mirroring application 116 may be launched and/or connected to another computing device based on an interaction with a notification received by remote computing device 102A, and subsequently received by host computing device 114A. For example, a user may setup a feature where application notifications from the user's smart phone (e.g., remote computing device 102A) are received by one or more of the user's other devices (e.g., host computing device 114A). Thus, in a specific example, a text message notification from remote computing device 102A may also be received by host computing device 114A, a user may interact with the notification on host computing device 114A and thereby automatically cause device mirroring application 116 to launch, with the device mirroring application user interface displaying a mirrored display of what the same interaction would produce if the user interacted with the notification on remote computing device 102A.

Host computing device 114A and remote computing device 102A may connect and communicate with one another for device mirroring application purposes via various network types. In this example, host computing device 114A and remote computing device 102A are illustrated as communicating via Bluetooth connection. Host computing device 114A and remote computing device 102A may communicate with one another via alternative means (e.g., if the devices are not within Bluetooth range), such as via the Internet, a local area connection, a WiFi connection, etc.

In some examples, once a connection has been established between host computing device 114A and remote computing device 102A, event metadata filtering engine 112, which may be encompassed in a device mirroring application installed on remote computing device 102A, may receive event metadata associated with remote computing device 102A. The event metadata may include metadata generated by and/or associated with remote computing device 102A's operating system and/or metadata generated by and/or associated with applications executed by remote computing device 102A. In examples, the event metadata may comprise one or more of: structural metadata, descriptive metadata, process metadata, descriptive metadata, and/or accessibility metadata. For example, the mirroring application executed on remote computing device 102A may subscribe and/or be provided with access to (in real or near real-time) all or a set of metadata generated by the operating system and/or applications of remote computing device 102A.

According to examples, event metadata filtering engine 112 may apply one or more rules to the event metadata to filter and/or identify a subset of data that is relevant from an accessibility standpoint on the host device side. For example, metadata filtering engine 112 may filter out irrelevant metadata from an accessibility standpoint (e.g., battery life information, device location information, information from out-of-focus windows/tabs, etc.) while tagging or otherwise identifying metadata that is relevant from an accessibility standpoint (e.g., in-focus text information, user interface focus location information, image information, etc.) for forwarding to host computing device 114A and device mirroring application 116. Once tagged and/or identified, remote computing device 102A/102B may send that tagged and/or identified relevant metadata to host computing device 114A/114B.

In this example, a user has utilized a cursor on host computing device 114B to interact with the mirror user interface of remote computing device 102B on device mirroring application 117. Specifically, the user navigates to the text of element UX1 124, which may cause remote computing device 102B to generate metadata describing the location of the user's focus (i.e., text of element UX1 124), as well as metadata describing the text at that location. That information, being relevant from an accessibility standpoint, may be identified/tagged by event metadata filtering engine 112 and sent via wire communication (e.g., Bluetooth, WiFi) to host computing device 114B and device mirroring application 117.

The accessibility-relevant metadata that is sent from remote computing device 102B to host computing device 114B may be received by translation engine 128, which may be associated with device mirroring application 124. Translation engine 128 may identify the raw metadata that it receives from remote computing device 102B and determine a set of transforms to apply to that metadata such that accessibility engine 130 may perform one or more related accessibility operations on that data for presenting a native accessibility experience corresponding to the metadata on device mirroring application 117. In some examples, accessibility engine 130 may be incorporated all or in part in device mirroring application 117. In other examples, accessibility engine 130 may be incorporated with and/or associated with the operating system of host computing device 114B and/or an accessibility application executed on host computing device 114B.

Accessibility engine 130 may perform operations on locally hosted data and data received from remote computing device 102B, which allow it to provide accessibility features to users that may have disabilities and/or impairments, such as sight impairments, hearing impairments, reading impairments, etc. When accessibility engine 130 performs operations on locally hosted data, it automatically generates a native accessibility experience that corresponds to the local data that it performs those operations on. For example, if a user utilizes a web browser installed locally on host computing device 114B and a webpage in that web browser user interface is scrolled over with a cursor and/or otherwise interacted with by the user, accessibility engine 130 may perform one or more operations on the interacted-with text and/or metadata associated with the interacted-with text, such as: sending the text to a text-to-speech engine and audibly narrating the text via computing device 114B; magnifying the text if it falls below a threshold size; and/or indicating the area of focus on the user interface (e.g., highlighting the interacted-with text, putting a box around the interacted-with text).

Because remote computing device 102B may not operate on a same platform as host computing device 114B, there may not be a one-to-one mapping between data inputs from remote computing device 102B and accessibility operations that can be performed on those data inputs by accessibility engine 130. Thus, translation engine 128 may augment/transform received accessibility-related data from remote computing device 102B, and provide that data to accessibility engine 130 in a form that accessibility engine 130 can perform native accessibility operations on. For example, when the user interacts with element UX1 124 via device mirroring application 124, the text information and location/focus information associated with that interaction may be sent, via event metadata filtering engine 112, from remote computing device 102B to translation engine 128, and translation engine 128 may perform one or more transforms on that data such that it can be read and operated on by accessibility engine 130. Accessibility engine 130 may then perform native accessibility operations on the transformed data and produce native accessibility experiences from that data, including narrating the interacted-with text at element UX1 124 (as illustrated by narration element 126) and/or highlighting or otherwise indicating the location of user focus (i.e., interacted with text at element UX1 124).

Figure 2:
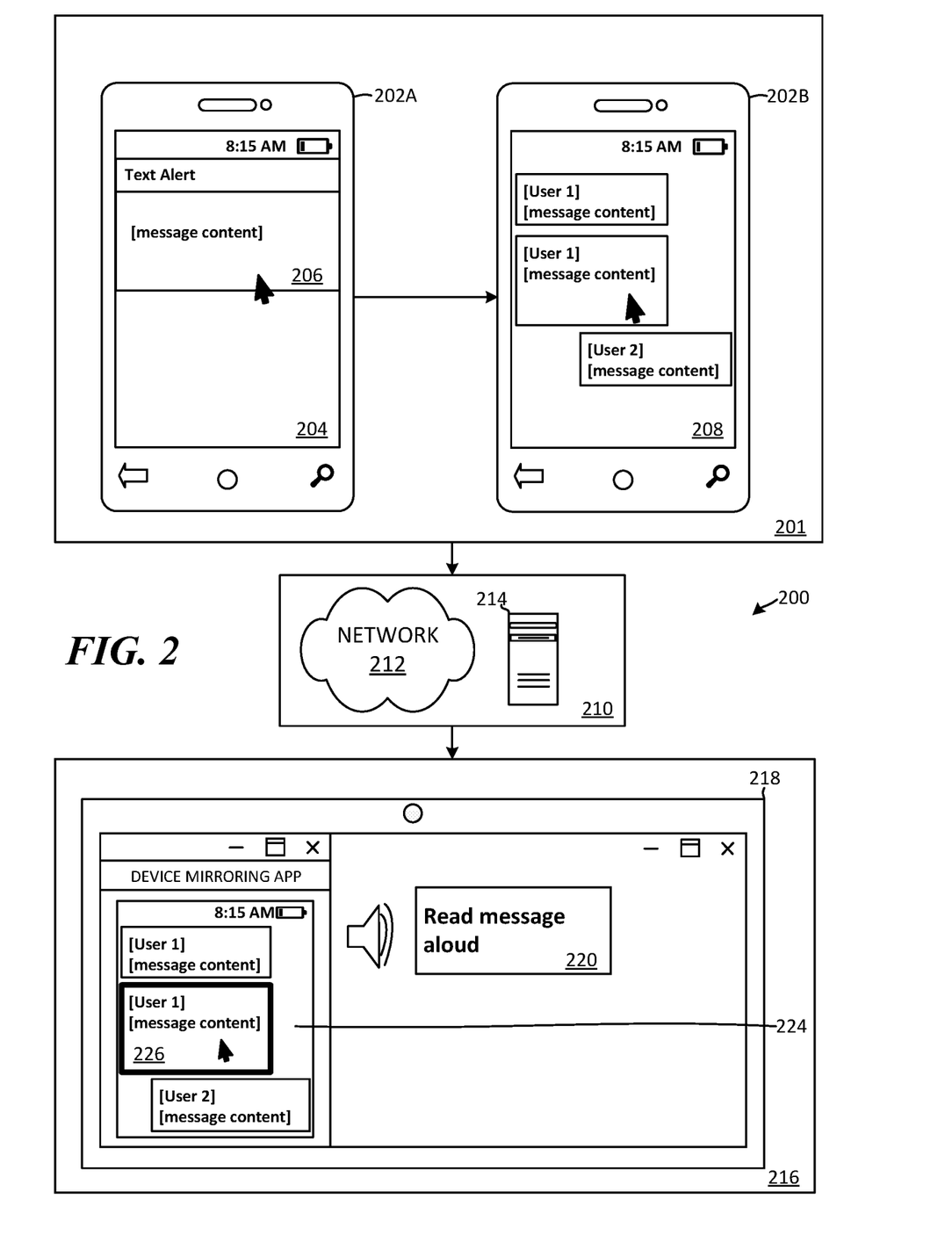
FIG. 2 is a schematic diagram illustrating an example distributed computing environment for enabling narration and user interface focus accessibility experiences via a cross-platform device mirroring application.

FIG. 2 is a schematic diagram illustrating an example distributed computing environment 200 for enabling narration and user interface focus accessibility experiences via a cross-platform device mirroring application. Computing environment 200 includes remote device sub-environment 201, network and processing sub-environment 210, and host device sub-environment 218.

Remote device sub-environment 201 includes remote computing device 202A and remote computing device 202B, which are the same computing device, with remote computing device 202A illustrating a text message notification 206 being received by remote computing device 202A and remote computing device 202B illustrating a corresponding text message application being expanded and displayed when a user interacts with text message notification 206.

Host device sub-environment 216 includes host computing device 218, which is executing device mirroring application 224. In examples, host computing device 218 may receive push notifications corresponding to notifications that are received by remote computing device 202A/202B. Thus, when text message notification 206 is received on remote computing device 202A, a corresponding notification may be received by host computing device 218. In examples, if a user interacts with the text message notification on host computing device 218, device mirroring application 224 may be launched on host computing device 218 when the text message application is thereby expanded and displayed on computing device 202B. Thus, device mirroring application 224 also displays the expanded text message application that is current on remote computing device 202B. In this example, remote computing device 202A/202B and host computing device 218 are illustrated as communicating with one another via network 212 for purposes mirroring remote computing device 202A/202B on host computing device 218. For example, if remote device 202A/202B and host device 218 are not within Bluetooth communication range of one another, those devices may a network such as network 212 for communicating for mirroring purposes.

In examples, an event metadata filtering engine executed on remote computing device 202A/202B may apply a set of rules for identifying accessibility-relevant metadata for tagging and sending to host device 218. In some examples, the metadata filtering engine may be integrated in a device mirroring application that has been installed on remote computing device 202A/202B. In other examples, the metadata filtering engine may be integrated in the operating system of remote computing device 202A/202B. In this example, a user has utilized a cursor on host computing device 218 to interact with (e.g., scroll over, select, etc.) text message 226 displayed on device mirroring application 224. Remote computing device 202B may, via the device mirroring application installed that end, receive a corresponding interaction (e.g., relay a touch interaction on text message 226). Event metadata associated with that interaction may be tagged by the metadata filtering engine executed on remote computing device 202B.

Remote computing device 202B may then send the tagged metadata associated with the interaction with text message 226 from remote computing device 202B to host computing device 218. A translation engine associated with device mirroring application 224 may receive the tagged metadata (e.g., text metadata corresponding to the message content of text message 226; user/cursor location on the messaging application at text message 226, etc.). The translation engine may read the received metadata and perform one or more operations on that metadata to augment and/or transform the metadata to a form that is readable by an accessibility engine operating on host computing device 218. The accessibility engine may the augmented and/or transformed metadata, and produce a native accessibility experience on host computing device 218 via device mirroring application 224, as if the text messaging application were being executed entirely on host computing device 218. In this example, the native accessibility experience is illustrated by the "read message aloud" narration element 220 (i.e., host computing device 218 audibly reads the interacted-with message content of text message 226), and by highlighting or otherwise bolding the element of the text message application that has been interacted with (i.e., the bolded rectangle surrounding text message 226 on device mirroring application 224).

Although the event metadata filtering engine is described as being executed on remote computing device 202A/202B, and the translation engine is described as being executed on host computing device 218, it should be understood that one or both of those engines may be executed in the cloud. For example, one or both of the event metadata filtering engine and/or the translation engine may be executed by an accessibility mirroring service operating on one or more server computing device, such as server computing device 214 in network and processing sub-environment 210.

Figure 3:
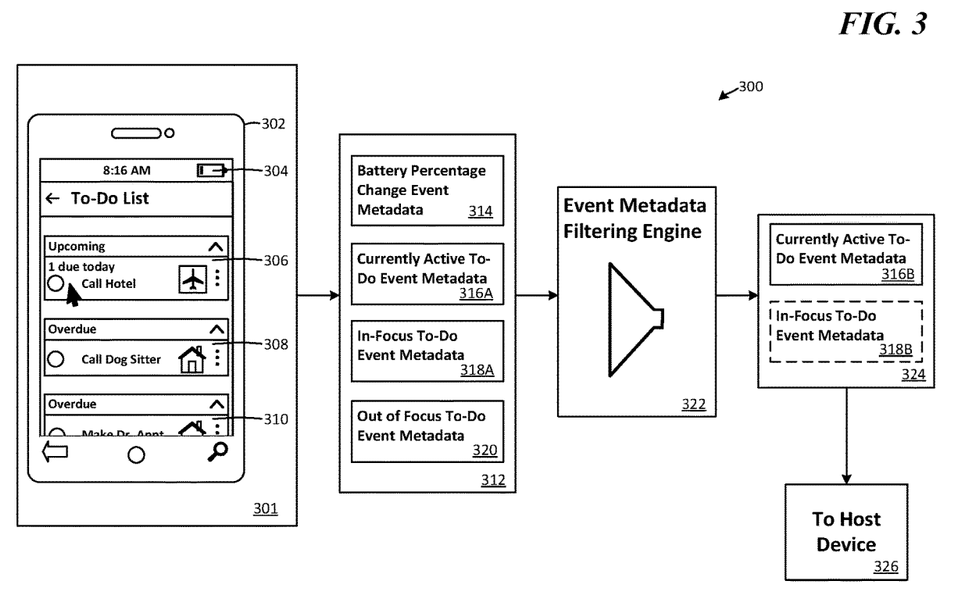
FIG. 3 illustrates a simplified diagram of a metadata event filtering engine applied on a remote device-side of a cross-platform distributed computing environment.

FIG. 3 illustrates a simplified diagram 300 of a metadata event filtering engine applied on a remote device-side of a cross-platform distributed computing environment. Diagram 300 includes remote device sub-environment 301, event metadata sub-environment 312, event metadata filtering engine 322, tagged metadata sub-environment 324, and host device transfer element 326.

According to examples, a user associated with remote computing device 302 may have installed a device mirroring application on remote computing device 302 and one or more other computing devices (e.g., host devices). Remote computing device 302 and the one or more other computing devices that the device mirroring application is installed on may operate on same or different computing platforms. The device mirroring application may allow a host device to produce a mirrored display of what is currently being displayed on remote computing device 302, while allowing a user to interact virtually with that display and have the operations that are initiated via the display on the host device executed by remote computing device 302. Thus, if a user interacts with a selectable application element shown in the device mirroring application (i.e., a remote device application shown in the mirrored user interface on the host device), the application element will be caused to initiate its corresponding action on remote computing device 302, while having any user interface modifications that are caused thereby displayed on both remote computing device 302 and the mirrored instance of remote computing device 302 on the host device.

As part of the device mirroring application installed on remote computing device 302, event metadata filtering engine 322 may receive metadata associated with events on remote computing device 302. Event metadata filtering engine 322 may receive all or a subset of metadata generated by remote computing device 302. In some examples, the metadata received by event metadata filtering engine 322 may specifically designated by a user (e.g., all contextual metadata, a set of contextual metadata, a type of contextual metadata). In this example, remote computing device is executing a to-do list application. As shown on the to-do list application user interface on remote computing device 302, an upcoming event user interface element 306 ("call hotel") is fully visible on the user interface; a first overdue event user interface element 308 ("call dog sitter") is fully visible on the user interface, and a second overdue event user interface element 310 ("make dr. appt.") is partially visible on the user interface. Additionally, battery life user interface element 304 is also displayed on remote computing device 302.

In this example, metadata associated with each of the user interface elements on remote computing device 302 are received by event metadata filtering engine 322. This is illustrated in event metadata sub-environment 312 by: battery percentage change event metadata 314, corresponding to battery life user interface element 304 moving a percentage in battery life (e.g., 15% full to 14% full); currently active to-do event metadata 316A, corresponding to upcoming event user interface element 306 ("call hotel"); in-focus to-do event metadata 318, corresponding to first overdue event user interface element 308 ("call dog sitter"); and out of focus to-do event metadata 320, corresponding to second overdue event user interface element 310 ("make dr. appt."). The metadata for each of user interface elements 306, 308 and 310 may provide information related to the text included in those elements, the location of those elements on the user interface (or partially off of the user interface in the case of second overdue event user interface element 310), and/or whether a user is currently interacting with those user interface elements, for example.

Event metadata filtering engine 322 may apply a set of rules to the metadata in event metadata sub-environment 312 to determine whether one or more pieces of that metadata are relevant from an accessibility standpoint. For example, a first rule may dictate that metadata indicating that battery life of remote computing device 302 has changed be automatically filtered out and discarded by event metadata filtering engine 322; a second rule may dictate that metadata describing a location on remote computing device 302's user interface where a user has currently interacted with a user interface element be automatically tagged as being relevant by event metadata filtering engine 322; a third rule may dictate that metadata describing a location of other active user interface elements that are currently in-focus (e.g., entirely visible on the user interface), but not active (e.g., not currently interacted with by a user), be automatically tagged as being relevant (e.g., to enhance the speed at which an accessibility engine can access that information if a user decides to select that element) by event metadata filtering engine 322; and a fourth rule may dictate that metadata describing a location of out of focus to-do user interface elements be filtered out and discarded by event metadata filtering engine 322.

Thus, in this example, event metadata filtering engine 322: filters out battery percentage change event metadata 314 based on application of the first rule; filters out out of focus to-do event metadata 320; tags currently active to-do event metadata 316A as being relevant; and tags in-focus to-do event metadata 318 as being relevant. Event metadata filtering engine 322 then sends the tagged relevant metadata to the host device, as indicated by currently active to-do event metadata 316B and in-focus to-do event metadata 318B in tagged metadata sub-environment 324. A translation engine on the host device can then augment and/or perform one or more transformations on the tagged metadata such that an accessibility engine on the host device can read and perform accessibility operations for generating a native accessibility experience from that metadata on the host device.

Figure 4:
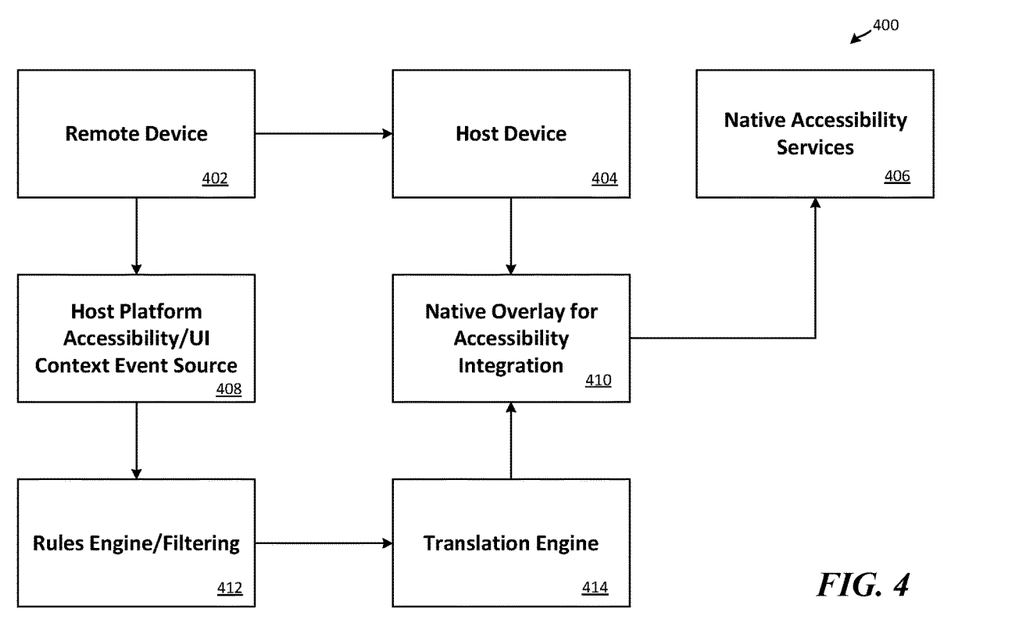
FIG. 4 illustrates a simplified block diagram of an example distributed computing environment for enabling cross-platform remote accessibility experiences.

FIG. 4 illustrates a simplified block diagram of an example distributed computing environment 400 for enabling cross-platform remote accessibility experiences. Computing environment 400 includes remote device sub-environment 402, host device sub-environment 404, native accessibility services sub-environment 406, host platform accessibility/UI context event source sub-environment 408, native overlay for accessibility integration sub-environment 410, rules engine/filtering sub-environment 412 and translation engine sub-environment 414.

Host device sub-environment 404 includes a host device where a user would like to interact with a mirrored version of the user's remote device. For example, a user may have two or more devices available (e.g., a PC, a laptop, a tablet, a smart phone), and wish to interact with one or more of the devices (e.g., the smart phone and/or the tablet) when the user is engaged with one of the other devices (e.g., the PC or the laptop). The host device in this scenario would be the PC or the laptop, which the user may utilize a device mirroring application on for mirroring the remote device (i.e., causing the user interface of the remote device to be displayed in a substantially similar manner on the host device; providing access to the remote device and its resources via interaction with the mirrored user interface on the host device). A verification step may be in place by which a user must verify that she is the owner of devices that are going to be connected via a device mirroring application.

Alternatively, remote device sub-environment 402 includes a remote device that a user would like to have mirrored on the host. The remote device may also have the device mirroring application installed on it. The role of the device mirroring application on the remote device is however different in that it provides mechanisms for monitoring event metadata generated on the remote device, identifying relevant event metadata that corresponds to accessibility, receiving commands from a host device, and sending relevant event metadata back to the host device.

Host platform accessibility/UI context event source sub-environment 408 includes a monitoring engine on the remote device. The monitoring engine subscribes to at least a portion of metadata that is generated by the host device. For example, a user may only grant monitoring rights to the monitoring engine for monitoring contextual metadata. The monitoring engine may generally have access to metadata that includes user interface event metadata (e.g., what is currently in focus and/or active on a user interface of the remote device).

Rules engine/filtering sub-environment 412 includes an event metadata filtering engine that is executed by the remote device. The filtering engine applies a plurality of rules for identifying metadata received via the monitoring engine that is relevant from an accessibility standpoint. The filter essentially weeds out irrelevant events/background noise that may be included in this metadata, such as out of focus tabs and windows, background application events, battery usage data, GPS location, etc. The rules may be updated based on monitoring of telemetry data received from users of the device mirroring application. In examples, the filtering engine may tag event metadata that it determines is relevant from an accessibility standpoint and send that tagged metadata to a host device for processing.

Translation engine 414 includes a translation engine on the host device for processing the tagged metadata received from the remote device. The translation engine takes the raw metadata received from the remote device and converts it to a format that can be read and understood by the host device/system.

Native overlay for accessibility integration environment 410 also operates on the host device, and in some cases may be integrated with the translation engine. The native overlay for accessibility sub-environment augments and/or transforms the data from the translation engine to allow the native accessibility engine of the host device to read the metadata from the remote device and generate a native accessibility experience on the host device, via the device mirroring application, from the augmented/transformed data. In some examples, the augmentation and/or transformation of the data may include making the metadata received from the translation engine readable by a narrator component of the accessibility engine. In additional examples, the augmentation and/or transformation of the data may include making the metadata received from the translation engine readable by a visual focus component of the accessibility engine.

Native accessibility services sub-environment 406 includes the accessibility engine that operates on the host device. The accessibility engine may be responsible for receiving metadata generated by the host device itself and generating narration and visual accessibility experiences therefrom. The accessibility engine may also be responsible for receiving metadata from a remote device that has been augmented/transformed for injection into the accessibility engine, and producing a native accessibility experience from that data in the device mirroring application.

Figure 5:
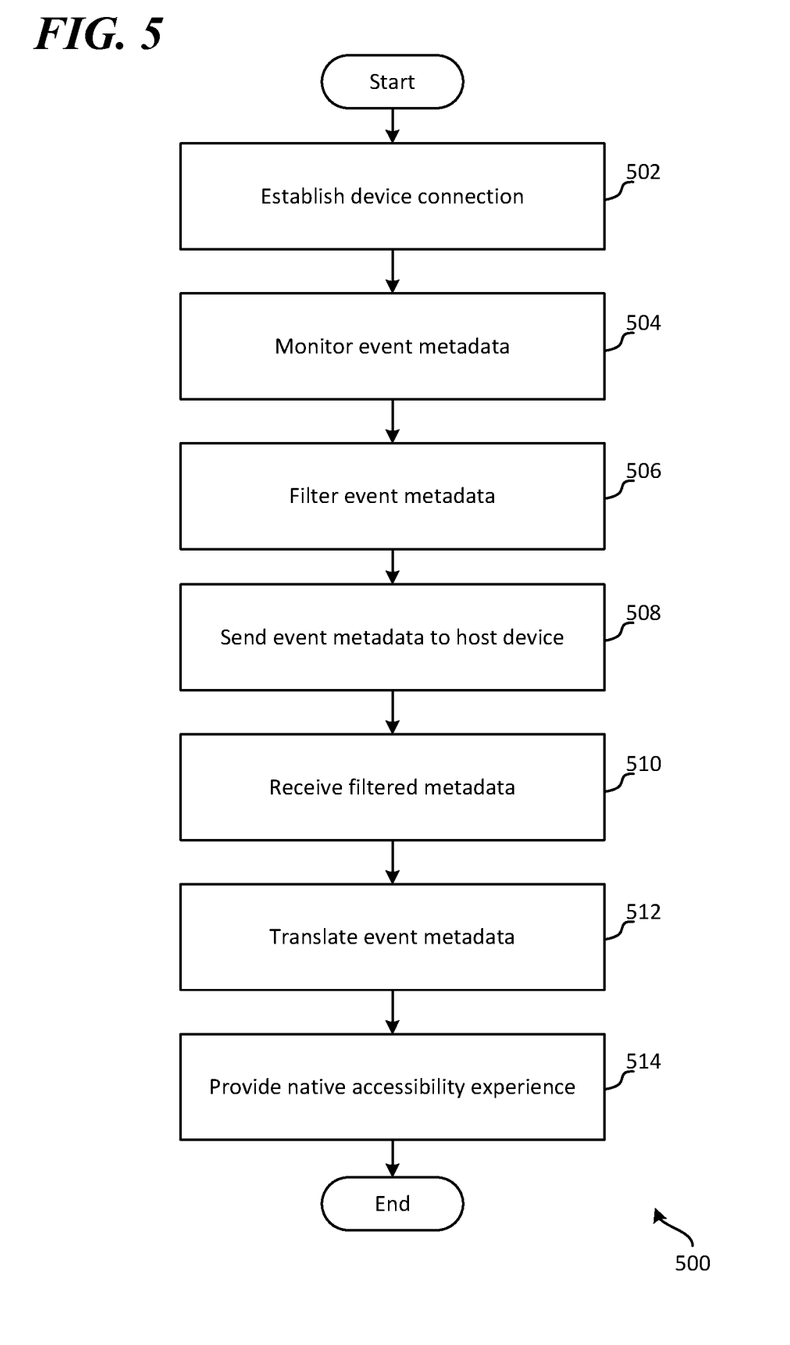
FIG. 5 is an exemplary method for assisting with cross-platform user experience accessibility.

FIG. 5 is an exemplary method 500 for assisting with cross-platform user experience accessibility. The method 500 begins at a start operation and flow continues to operation 502 where a connection between a host device and a remote device is established. The connection may be a Bluetooth connection, a local area connection, a WiFi connection, or a network service connection. In some examples, a user may install a device mirroring application on a host device for mirroring one or more remote devices on the host device. The user may also install a device mirroring application on the one or more remote devices for having the remote devices mirrored on the host device. In some examples, the user may have to authenticate her devices and/or her identity of being the owner of the devices before a connection may be made.

From operation 502 flow continues to operation 504 where event metadata generated by the remote device is monitored. The metadata may be monitored by a monitoring engine executed on the remote device. In some examples, the user associated with the remote device may grant "listening" privileges to the monitoring engine such that all or a subset of event metadata may be monitored by the monitoring engine.

From operation 504 flow continues to operation 506 where the event metadata is filtered such that accessibility-related information can be identified and/or tagged. The filtering may comprise a filtering engine that applies one or more rules for identifying accessibility-related information. The accessibility-related information may relate to a focus and/or active element of a user interface, text metadata and/or image metadata. In some examples, the filtering engine may discard event metadata that is not accessibility-related (e.g., device location data, battery usage data, etc.), and the filtering engine may tag event metadata that it determines is accessibility-related and/or relevant based on application of the one or more rules.

From operation 506 flow continues to operation 508 where the filtered event metadata (i.e., accessibility-related information that has been identified and/or tagged) is sent to the second device for accessibility translation (i.e., augmentation and/or transformation for reading and performing operations on by an accessibility engine on the host device).

From operation 508 flow continues to operation 510 where the filtered event metadata is received by the host device.

From operation 510 flow continues to operation 512 where the filtered event metadata is translated to a form that is readable by an accessibility engine operating on the second device. The metadata may be sent from the remote device to the host device in a form that the host device cannot read and/or perform accessibility-related operations on while in its raw form due to the remote device being of a different platform than the host device. As such, a translation engine may augment and/or transform the metadata to a form that is readable and executable by an accessibility engine on the host device.

From operation 512 flow continues to operation 514 where the host device provides a native accessibility experience corresponding to the translated event metadata. The accessibility engine on the host device takes the translated metadata and performs one or more accessibility-related operations on that data for producing a native experience within the device mirroring application. In some examples, the native accessibility experience may comprise narration of an active and/or in-focus user interface element of the remote device. In other examples, the native accessibility experience may be highlighting or otherwise visually indicating an active and/or in-focus user interface element on the remote device via the device mirroring application.

From operation 514 flow moves to an end operation and the method 500 ends.

Figure 6:
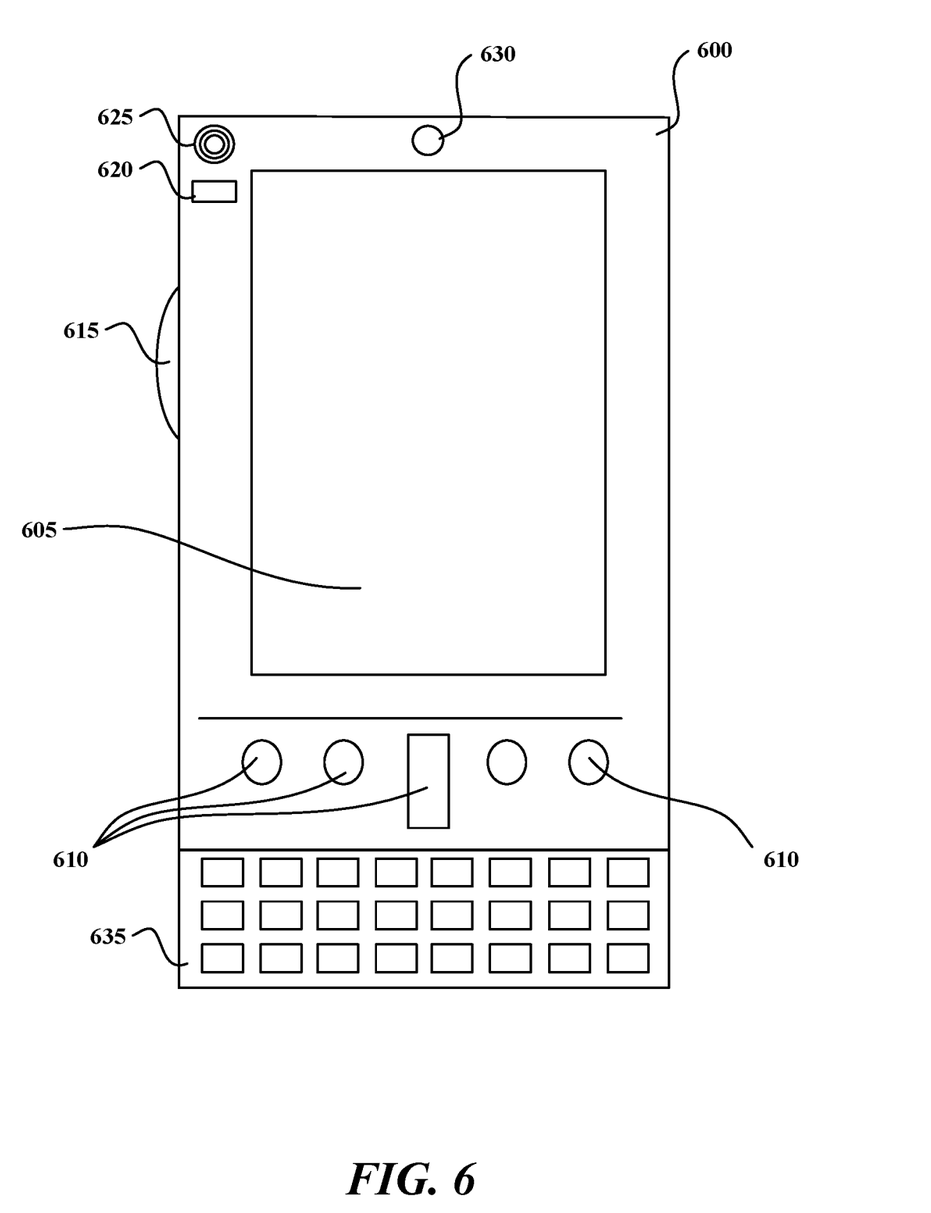
FIGS. 6 and 7 are simplified diagrams of a mobile computing device with which aspects of the disclosure may be practiced.
Figure 7:
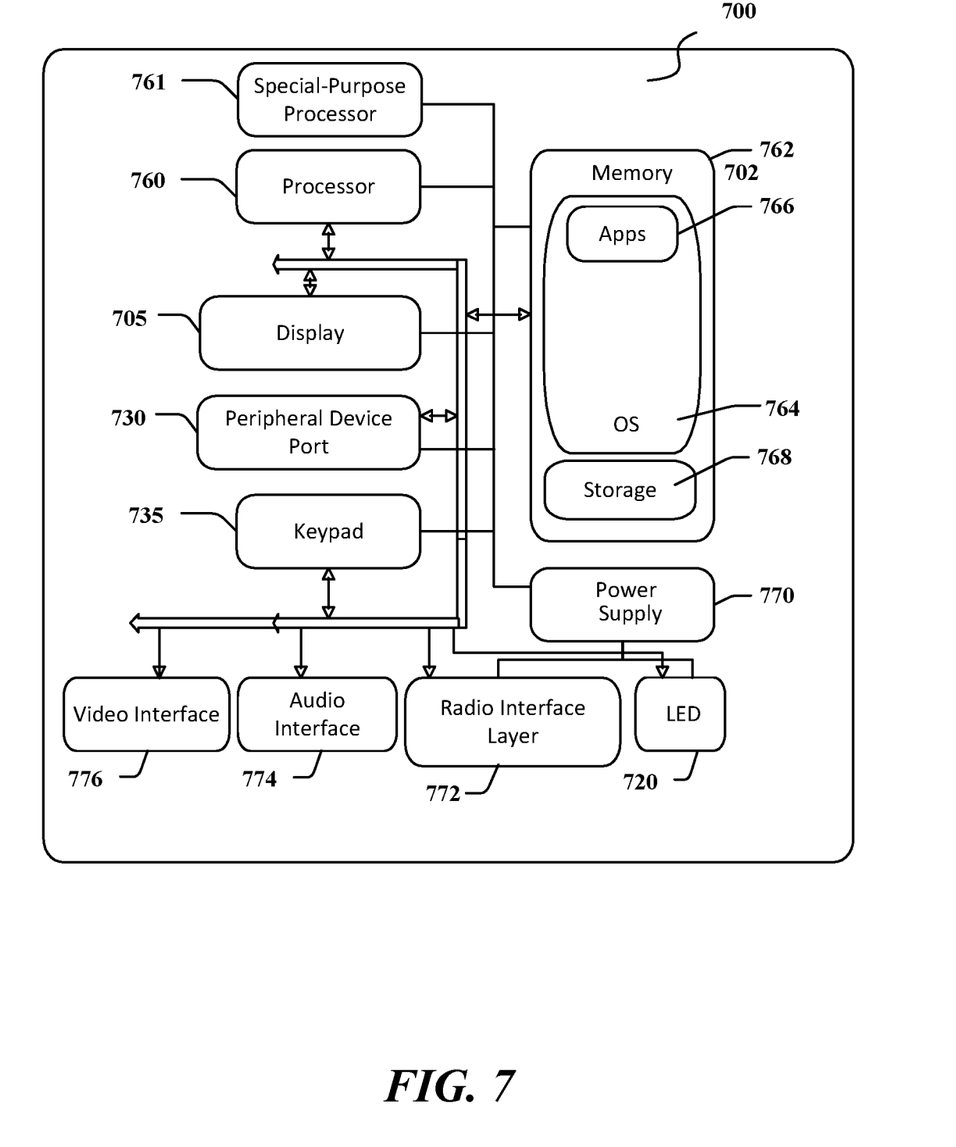

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a user experience transformation computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
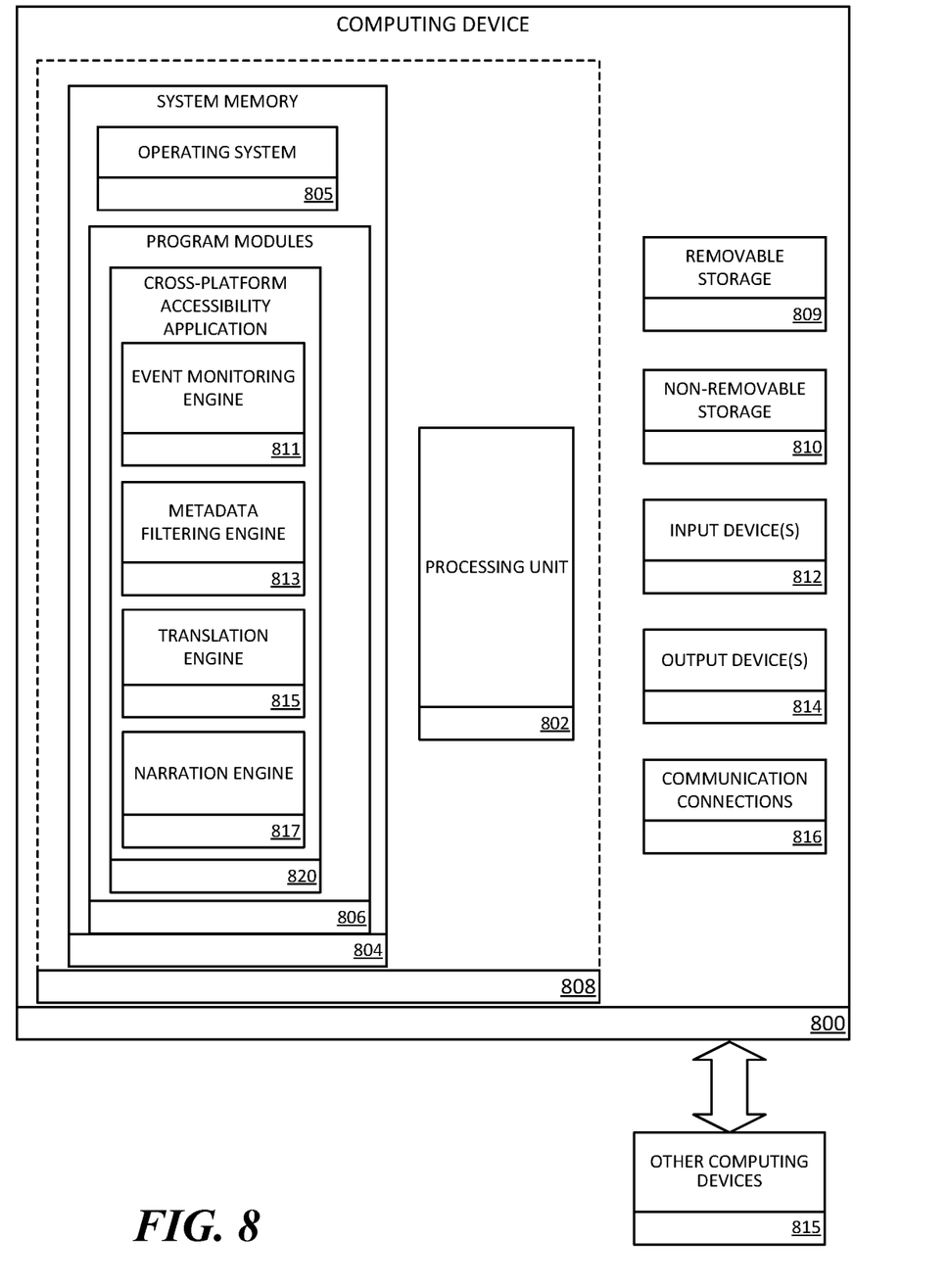
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for providing a consistent cross-platform user experience and a native accessibility experience across devices. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more cross-platform accessibility applications. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., cross-platform accessibility application 820) may perform processes including, but not limited to, the aspects, as described herein. According to examples, event monitoring engine 811 may monitor event metadata generated by a remote computing device. Metadata filtering engine 813 may apply a set of rules for identifying accessibility-relevant metadata from the remote device. Translation engine 815 may perform one or more operations associated with augmenting and/or transforming raw metadata from the remote device to a form that is readable and executable by an accessibility engine of a host device. Narration engine 817 may perform one or more operations associated with producing an audible output describing one or more user interface elements on a host device and/or a remote device.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
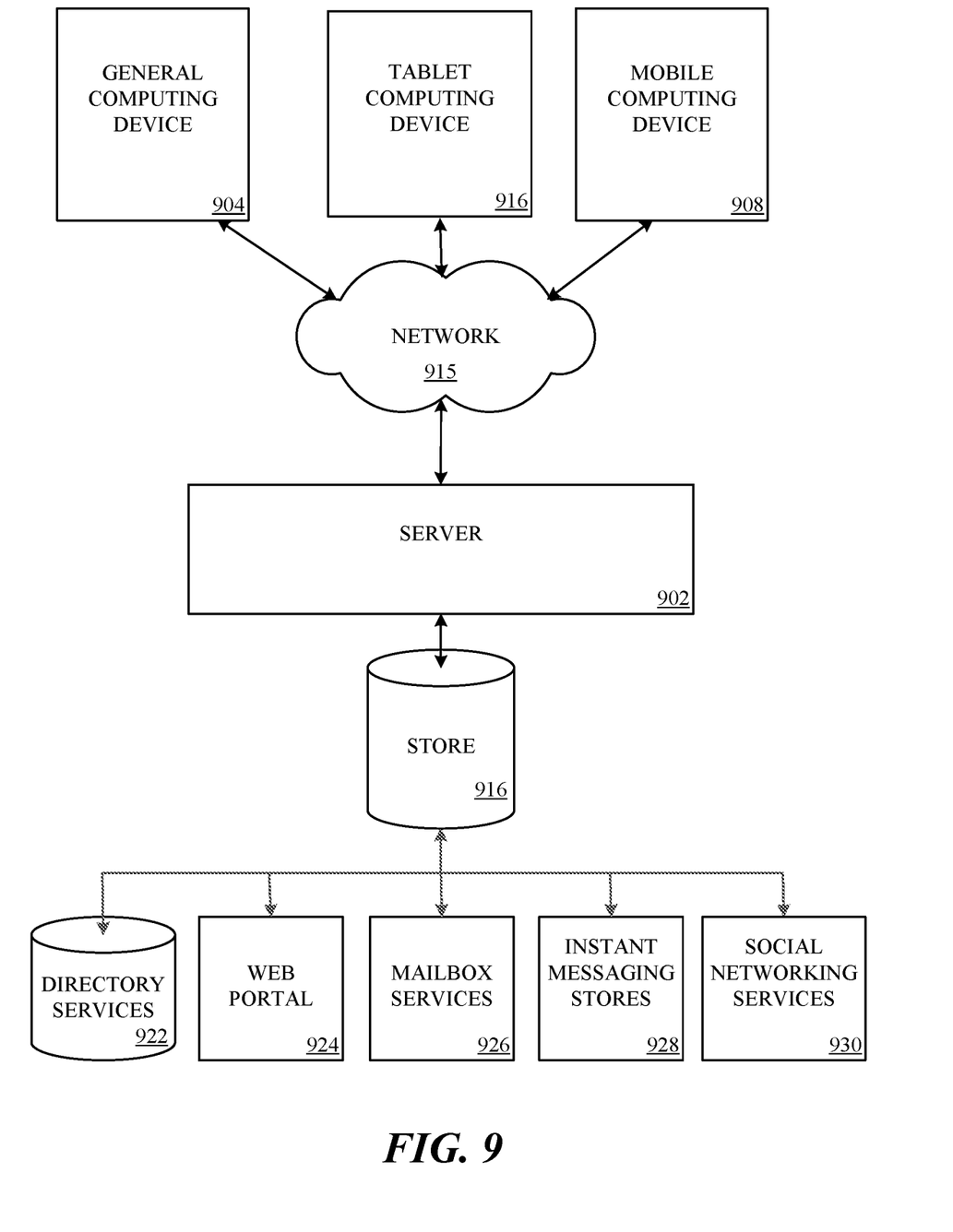
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for assisting with cross-platform user experience accessibility, the method comprising:
    establishing, by a first device, a connection with a second device;
    monitoring event metadata generated by the first device;
    filtering out background event metadata from the event metadata;
    tagging metadata from the event metadata that is accessibility related, wherein text metadata associated with text displayed by the first device is tagged from the event metadata;
    sending the tagged event metadata to the second device in a first form compatible with a first platform executed by the first device for accessibility translation into a second form compatible with a second platform executed by the second device;
    receiving, by the second device, the tagged event metadata;
    translating, by the second device, the tagged event metadata to a form readable by an accessibility engine operating on the second device; and
    providing, by the second device, a native accessibility experience corresponding to the translated event metadata, wherein the providing comprises producing one of: an audio output corresponding to the text metadata; a braille output corresponding to the text metadata; and a haptic output corresponding to the text metadata.

2. The method of claim 1, wherein the connection between the first device and the second device is established via a device mirroring application for mirroring the first device on the second device.

3. The method of claim 1, wherein the event metadata is monitored by a device mirroring application executed on the first device.

4. A computer-readable storage media comprising executable instructions that, when executed by one or more processors, assist with user experience accessibility, the computer-readable storage media including instructions executable by the one or more processors for:
    establishing, by a first device, a connection with a second device;
    monitoring event metadata generated by the first device;
    filtering out background event metadata from the event metadata;
    tagging metadata from the event metadata that is accessibility related, wherein text metadata associated with text displayed by the first device is tagged from the event metadata;
    sending the tagged event metadata to the second device in a first form compatible with a first platform executed by the first device for accessibility translation into a second form compatible with a second platform executed by the second device;
    receiving, by the second device, the tagged event metadata;
    translating, by the second device, the tagged event metadata to a form readable by an accessibility engine operating on the second device; and
    providing, by the second device, a native accessibility experience corresponding to the translated event metadata, wherein the providing comprises producing one of: an audio output corresponding to the text metadata; a braille output corresponding to the text metadata; and a haptic output corresponding to the text metadata.

* * * * *